Sept. 22, 1953     C. M. SEIBEL     2,652,700
VIBRATION DAMPER FOR LONG SHAFTS
Filed Jan. 24, 1952
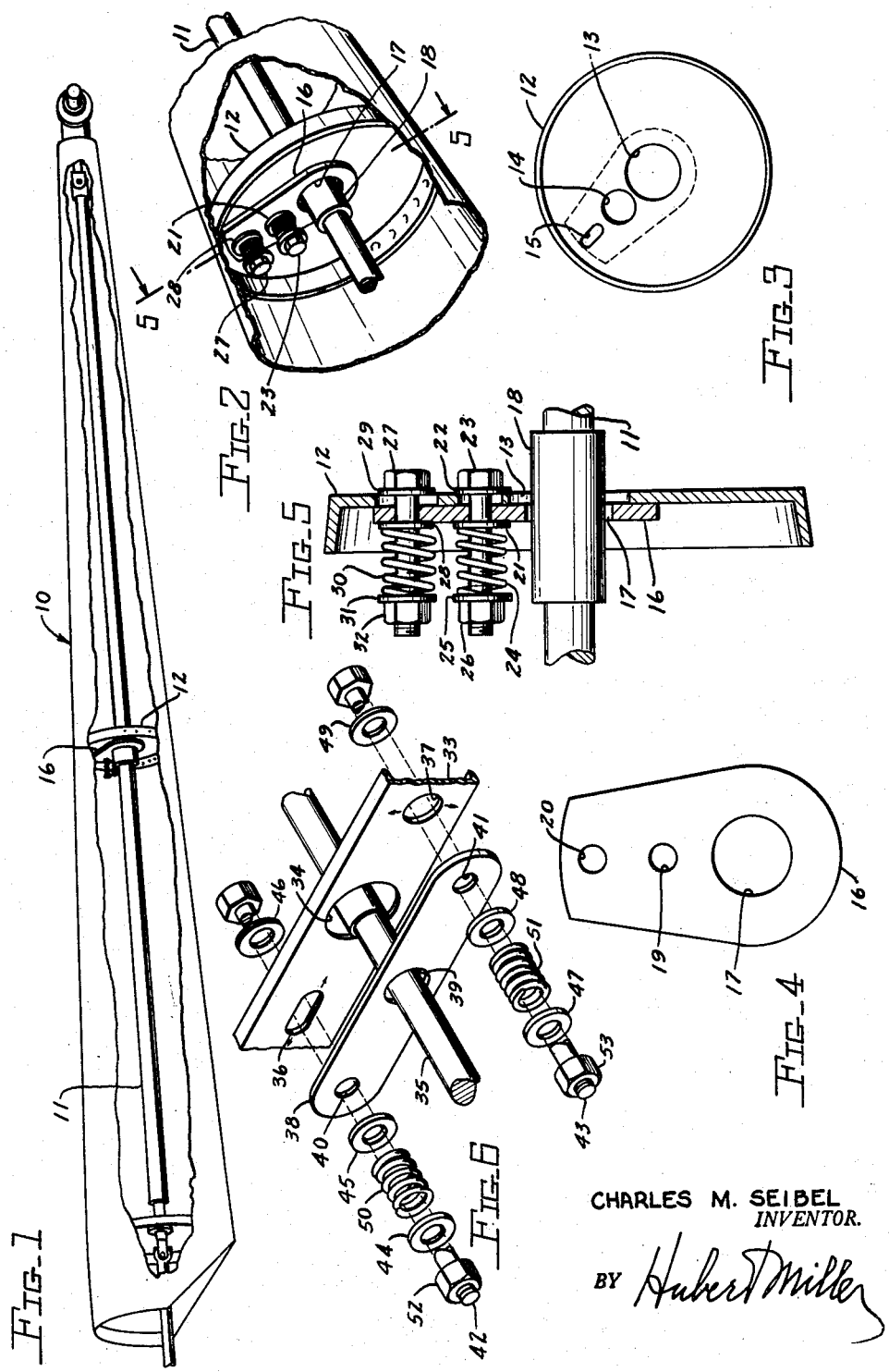
CHARLES M. SEIBEL
*INVENTOR.*
BY *Hubert Miller*

Patented Sept. 22, 1953

2,652,700

UNITED STATES PATENT OFFICE 2,652,700

VIBRATION DAMPER FOR LONG SHAFTS

Charles M. Seibel, Wichita, Kans., assignor, by mesne assignments, to The Cessna Aircraft Company, Wichita, Kans.

Application January 24, 1952, Serial No. 268,003

10 Claims. (Cl. 64—1)

This invention relates to vibration damping mechanisms, and more particularly to a damper for the central portions of elongated driven shafts supported by bearings located only at their opposite ends.

It is commonly known that as the rotational velocity of a shaft increases, the shaft passes through several progressively higher speed ranges known as critical speeds. When a shaft is unsupported intermediate its ends and is rotated at or near what is commonly known as its first critical speed, centrifugal forces periodically exceed centripetal forces at its median portion, the shaft bows outward away from its normal rotational axis, its rotary motion becomes unstable, and vibration becomes excessive. Such vibration may quickly damage bearings, and often damages even the bearing supporting structure, as well as the shaft.

After the shaft reaches a speed higher than its first critical speed, vibration subsides, and the shaft rotates smoothly with its rotational axis passing through its center of gravity. Since the second critical speed of a given shaft is four times as great as its first critical speed, there is a wide range of rotational speeds between these two critical speeds at which the shaft will operate entirely satisfactorily, with little or no vibration, and with little effect on the bearings save normal wear.

While a shaft can also be operated satisfactorily and safely at rotation speeds below its first critical speed range, it is often more practical for the particular machine operation to have the shaft revolve at a higher speed. This means that the first critical speed of the shaft must be increased, or that the shaft must be rotated at a speed between its first and second critical speeds. If the first alternative is elected, the first critical speed of the shaft may be increased by shortening it, or by increasing its rigidity, the latter change usually being accomplished by increasing its diameter with an accompanying increase in weight, size of bearings, etc. Often neither of these changes is possible, due to the weight and size specifications of the machine being designed —aircraft, for instance.

If the second alternative is elected, that of operating the shaft at a speed in excess of its first critical speed, then design changes are also required. Some provision must be made to reduce, absorb, or eliminate the excessive vibration of the shaft intermediate its bearing supported ends as it is accelerated through its first critical speed range. In the past this has been accomplished by providing an additional bearing at or near the longitudinal center of the shaft. This involves a rigid bearing support which is often difficult or impossible to provide due to the lack of adjacent rigid supporting structure in the machine being designed. It also involves the very serious problem of properly aligning the intermediate bearing with the two outer bearings, and in maintaining such alignment.

It is a primary object of this invention to provide a simple damping mechanism for the central portion of a rotating shaft which will absorb a major portion of the shaft vibrations as it is accelerated through its first critical speed range, thus making it possible to operate the shaft at a rotational speed between its first and second critical speeds.

It is a further object to provide a damper for the above mentioned purpose which adds very little weight to the structure being designed, which requires no highly rigid supporting structure intermediate the shaft ends, and which will thus aid the designer greatly in designing machines which require relatively long light weight shafts operating at relatively high rotational speeds.

The invention, together with other objects attending its production, will be more clearly understood when the following description is read in connection with the accompanying drawings, in which:

Fig. 1 is a perspective view of a helicopter tail boom with part of the shell cut away, and shows installation of one embodiment of my invention intermediate the ends of the tail rotor drive shaft;

Fig. 2 is an enlarged fragmentary view of the same installation;

Figs. 3 and 4 are plan views of certain parts of that embodiment of the invention illustrated in Figs. 1 and 2, and show details of construction;

Fig. 5 is a detailed sectional view taken along the line 5—5 of Fig. 2; and

Fig. 6 is an exploded view, in perspective, illustrating a different embodiment of my invention.

The invention has been illustrated in connection with a helicopter because the transmission of power to the tail rotor at the aft end of the tail boom 10 has always presented a serious design problem. Due to the speed at which the tail rotor drive shaft 11 must rotate, and the necessary length of the tail boom, it has not previously been considered possible to use a single shaft supported in bearings only at its opposite ends. Increasing the diameter and rigidity of a single shaft to keep it operating below its first critical speed has not been feasible due to the excessive additional weight involved. The only solutions have been to provide one or more additional bearings and bearing supports intermediate the ends of the shaft, or to use two or more short shafts coupled together by universal joints, and, also supported by suitable bearings spaced along the tail boom. Both these solutions have involved additional unwanted weight.

Referring to the drawings, particularly Fig. 2, it will be seen that my solution to this problem includes the installation of one bulkhead or plate 12 approximately midway between the bearing supported ends of tail rotor drive shaft 11. This bulkhead is provided with a central aperture 13, the diameter of which is considerably larger than the diameter of the shaft. Bulkhead 12 is also provided with a smaller aperture 14, and an elongated aperture 15, as clearly shown in Fig. 3, all three of these apertures being disposed along a straight line, as shown.

A damper plate 16 (Fig. 4), is provided with a circular aperture 17 near one end, the diameter of this aperture being slightly greater than the diameter of the shaft wear sleeve 18. Plate 16 is also provided with spaced bolt holes 19 and 20, all three holes being in a straight line.

Plate 16 is installed flat against bulkhead 12 so that bolt hole 20 registers with slot 15, bolt hole 19 registers with aperture 14, and aperture 17 registers with larger aperture 13. Washers 21 and 22, of larger diameter than aperture 14, are then placed against the outer faces of bulkhead 12 and plate 16, respectively, in register with apertures 19 and 14, and a bolt 23 (Fig. 5) is passed through the washers. A compression spring 24, a washer 25, and a nut 26 are then placed on the bolt, as shown. A similar bolt 27 is passed through registering apertures 15 and 20, and is provided with friction washers 28 and 29, a spring 30, a washer 31, and a spring tension adjusting nut 32. The drive shaft 11 is, of course, passed through registering apertures 17 and 13. Bulkhead aperture 13 should be located so that shaft 11 normally operates centrally therein.

Operation

As shaft 11 begins to vibrate or wobble as it accelerates through its first critical speed, the surface of wear sleeve 18 instantaneously and repeatedly contacts the edge of aperture 17 in damper plate 16 at various points. At each impact plate 16 is forced to move with relation to bulkhead 12. Such movement is, of course, resisted by friction. Regardless of the direction in which each impact of the shaft tends to move plate 16, the friction between the contacting surfaces of the plate and bulkhead and between the washers and the surfaces which they contact will strongly resist and retard plate movement. This friction can, of course, be varied by adjusting the compression of springs 24 and 30. This resistance to plate movement absorbs energy which is tending to vibrate the shaft, and does so without exerting any material resistance to shaft rotation. The result is that shaft vibrations are held well below the danger point as the shaft either accelerates or decelerates through its first critical speed range.

Another important feature of this friction damper is that the energy absorbed from the shaft by the damper plate is not transmitted to the bulkhead or other plate supporting structure in the form of a shock. For this reason the bulkhead may be made of light gauge light weight sheet material, such as aluminum. Furthermore, none of the energy absorbed by the plate 16 is fed back to the shaft, as would be the case if a resilient means was used to receive shaft impacts.

It should be noted that elongated aperture 15 permits longitudinal movement of plate 16, and circular aperture 14, being considerably larger in diameter than bolt 23, permits both longitudinal and lateral movement of the plate. Energy is thus absorbed regardless of the direction in which shaft impact is applied to the plate. It should also be pointed out that steel wear sleeve 18 is not essential, but is preferred when a tubular aluminum alloy drive shaft is used, as shown.

Fig. 6 illustrates a slightly different embodiment of my invention. The plate supporting structure in this case is shown as a channel beam 33, having a central aperture 34 in its web through which the shaft 35 operates. Elongated aperture 36 and circular aperture 37 are positioned on opposite sides of shaft aperture 34, and the centers of all three are preferably in a straight line.

Damper plate 38 has a central aperture 39, which as in the case of the first embodiment, is only slightly larger in diameter than the shaft and considerably smaller in diameter than shaft aperture 34 in the plate supporting beam. A pair of bolt holes 40 and 41 are provided on opposite sides of aperture 39, these three last mentioned apertures 39, 40, and 41 being located to register with apertures 34, 36, and 37 respectively.

Bolts 42 and 43, washers 44 to 49 inclusive, compression springs 50 and 51, and nuts 52 and 53 complete the assembly, washers 45 and 46, and 48 and 49 bearing frictionally against the remote surfaces of plate 38 and beam 33, respectively, while springs 50 and 51 bear against washers 44 and 45, and 47 and 48, respectively.

The functioning of this last described embodiment is virtually the same as that of the first embodiment. Aperture 37 is sufficiently large in diameter to permit movement of bolt 43 therein in any radial direction with accompanying frictional sliding movement of plate 38 and washer 49 on the opposite surfaces of the web of beam 33. Slot 36 permits only longitudinal and pivotal movement of the adjacent end of plate 38 and of washer 46. Vibratory or wobbling movement of shaft 35 is thus effectively damped regardless of the direction in which impact force is transmitted to the edge of aperture 39. The absorption of energy in a lateral direction has simply been increased by increasing the distance between the two bolts 42 and 43 as opposed to the spacing between bolts 23 and 27 in the first described embodiment.

It should also be pointed out that my invention also includes the novel method of keeping the vibratory motions of the non-journaled central portion of a rotating shaft within safe limits during acceleration of the shaft through any one of its critical speeds by the direct application of inertia forces to the shaft in directions opposing the shaft vibratory movements.

Having described my invention with sufficient clarity to enable those familiar with this art to practice my method and to construct and use two separate forms of apparatus embodying the invention, I claim:

1. Apparatus for damping lateral vibratory movements of a rotating shaft comprising: a fixed independently supported plate having a large diameter shaft aperture within which the shaft rotates substantially centrally at low shaft speeds; a damper plate having a circular shaft aperture only slightly greater in diameter than that of the shaft, and within which the shaft rotates; and means mounting the damper plate flat against one surface of the fixed plate for frictional sliding movement with relation thereto in various parallel directions, and with the respective shaft apertures in register.

2. The apparatus described in claim 1 in which the damper plate mounting means includes spring means urging the adjacent surfaces of the two plates into positive frictional contact.

3. The apparatus described in claim 1 in which the damper plate mounting means includes means for varying the pressure of the damper plate against the fixed plate.

4. Apparatus for damping the vibratory movements of the intermediate portion of a rotating shaft which is journaled only near its opposite ends, comprising: a damper plate having a circular aperture therein only slightly greater in diameter than that of the shaft, and within which the shaft rotates; a fixed independently supported plate arranged substantially normal to the shaft rotational axis adjacent the longitudinal center of the shaft, said fixed plate having an aperture within which the shaft rotates, and which is considerably larger than the aperture in the damper plate; and means mounting the damper plate flat against one side surface of the fixed plate for slidable movement thereagainst.

5. The apparatus described in claim 4 in which the damper plate mounting means includes spring means urging the damper plate into firm frictional contact with the surface of the fixed plate.

6. Apparatus for damping the vibratory movements of the intermediate portion of a rotating shaft which is journaled only near its opposite ends, comprising: a fixed independently supported member having a plate-like portion arranged substantially normal to the shaft rotational axis, said plate-like portion having an aperture within which the intermediate portion of the shaft rotates centrally, the diameter of the aperture being considerably greater than that of the shaft; a damper plate having an aperture therein only slightly larger in diameter than the shaft and within which the intermediate portion of the shaft is free to rotate centrally, said damper plate being arranged flat against the plate-like portion of said member with the said apertures in register; and means securing the damper plate flat against the surface of said plate-like portion for slidable frictional movement with relation thereto in various directions.

7. The apparatus described in claim 6 in which the damper plate securing means includes means for varying the pressure of the damper plate against the surface of said plate-like portion to vary the frictional resistance to plate movement.

8. Apparatus for damping lateral vibratory movements of a rotating shaft comprising: a fixed independently supported plate having a large diameter shaft aperture within which the shaft rotates substantially centrally at low shaft speeds; an elongated damper plate having a circular shaft aperture only slightly greater in diameter than that of the shaft, and within which the shaft rotates; longitudinally spaced bolt holes in the damper plate; spaced apertures in the fixed plate considerably larger than said bolt holes and located to register therewith when the shaft apertures are in register and the plates properly oriented; and a pair of bolts through the respective bolt holes and through the respective registering apertures in the fixed plate, mounting the damper plate flat against one surface of the fixed plate for frictional sliding movement thereagainst in various parallel directions, and with the shaft apertures of the plates in register.

9. The apparatus described in claim 8, and a compression spring on each of said bolts urging the adjacent surfaces of the two plates into positive frictional contact.

10. Apparatus such as described in claim 9, and nuts on said bolts for varying the spring compression urging the two plates against each other.

CHARLES M. SEIBEL.

References Cited in the file of this patent

UNITED STATES PATENTS

| Number | Name | Date |
|---|---|---|
| 2,220,751 | Bergman | Nov. 5, 1940 |

FOREIGN PATENTS

| Number | Country | Date |
|---|---|---|
| 520,762 | Great Britain | 1940 |